United States Patent [19]
Yung-Sung

[11] Patent Number: 5,445,428
[45] Date of Patent: Aug. 29, 1995

[54] ADJUSTABLE SUNSHADE

[76] Inventor: Chuang Yung-Sung, No. 16, Ming Sheng Road, Hsinchu, Taiwan

[21] Appl. No.: 162,767

[22] Filed: Dec. 8, 1993

[51] Int. Cl.⁶ ............................................. B60J 3/00
[52] U.S. Cl. ................................... 296/97.7; 296/97.8
[58] Field of Search ........................... 296/97.7, 97.9; 160/37.2, DIG. 3

[56] References Cited

U.S. PATENT DOCUMENTS

| | | | |
|---|---|---|---|
| 2,681,199 | 6/1954 | Harwood | 296/97.7 X |
| 2,791,272 | 5/1957 | Stehlik | 296/97.7 X |
| 3,042,445 | 7/1962 | Lamar | 296/97.7 |
| 4,775,180 | 10/1988 | Phillips | 296/97.7 X |
| 5,044,686 | 9/1991 | Acenbrack | 296/97.9 X |
| 5,078,194 | 1/1992 | Phillips | 296/97.9 X |

*Primary Examiner*—Joseph D. Pape
*Attorney, Agent, or Firm*—Beveridge, DeGrandi, Weilacher & Young

[57] ABSTRACT

An adjustable sunshade includes a sunshade holder which has a mounting frame affixed to a windscreen at one side, a supporting rod connected to the mounting frame by a first swivel joint, and a bracket having a top end hinged to the top of the supporting rod. A screen is mounted on the bracket and has a retainer on its lead end. A fixed hinge is mounted on the supporting rod in the middle, and a movable hinge is provided to slide on the bracket. A second swivel joint has its two opposite ends respectively connected to the fixed hinge and the movable hinge. A locating device which includes a locating rod is fastened to the opposite side of the windscreen by a third swivel joint. This locating device is provided to hold the retainer of the screen.

9 Claims, 4 Drawing Sheets

ADJUSTABLE SUNSHADE

BACKGROUND OF THE INVENTION

The present invention relates to an adjustable sunshade for protecting the windscreen of an automobile against the radiation of the sun.

Various sunshades have been disclosed for use in automobiles to protect against the radiation of the sun, and such sunshades have appeared on the market. These sunshades are commonly not adjustable, and therefore they cannot fit all automobiles. Further, these sunshades are commonly complicated in structure and difficult to assemble and install.

SUMMARY OF THE INVENTION

The present invention has been accomplished under the aforesaid circumstances. It is therefore an object of the present invention to provide an adjustable sunshade which can be adjusted to fit the windscreen of any of a variety of automobiles. It is another object of the present invention to provide an adjustable sunshade which is easy to install.

According to one aspect of the present invention, the adjustable sunshade comprises a sunshade holder, and a locating device. The sunshade holder comprises a mounting frame affixed to the windscreen at one side, a supporting rod connected to the mounting frame by a first swivel joint, a bracket having a top end hinged to the top end of the supporting rod, a screen mounted on the bracket and having a retainer on a lead end thereof, a fixed hinge mounted on the supporting rod in the middle, a movable hinge made to slide on the bracket, and a second swivel joint having two opposite ends respectively connected to the fixed hinge and the movable hinge. The locating device comprises a locating rod fastened to the windscreen at an opposite side by a third swivel joint to hold the retainer of the screen. Therefore, the angular position of the screen can be adjusted by turning the supporting rod relative to the mounting frame of the sunshade holder and the bracket relative to the supporting rod.

According to another aspect of the present invention, each swivel joint is comprised of a first block and a second block connected together by a rivet permitting the first and second blocks to be turned on the rivet relative to each other, wherein the second block includes at least one blind hole located at the border thereof at one side, each blind hole receiving a respective spring and a respective steel ball. The steel ball in the blind hole is supported on the respective spring and stopped against the first block.

BRIEF DESCRIPTION OF THE DRAWINGS

FIG. 2A is a side view of the sunshade holder of the adjustable sunshade of FIG. 1, showing the first swivel joint connected between the connecting plate and the mounting plate;

FIG. 4A is a sectional view of the first swivel joint of the sunshade holder of the adjustable sunshade of FIG. 1.

DETAILED DESCRIPTION OF THE PREFERRED EMBODIMENT

Figure 1:
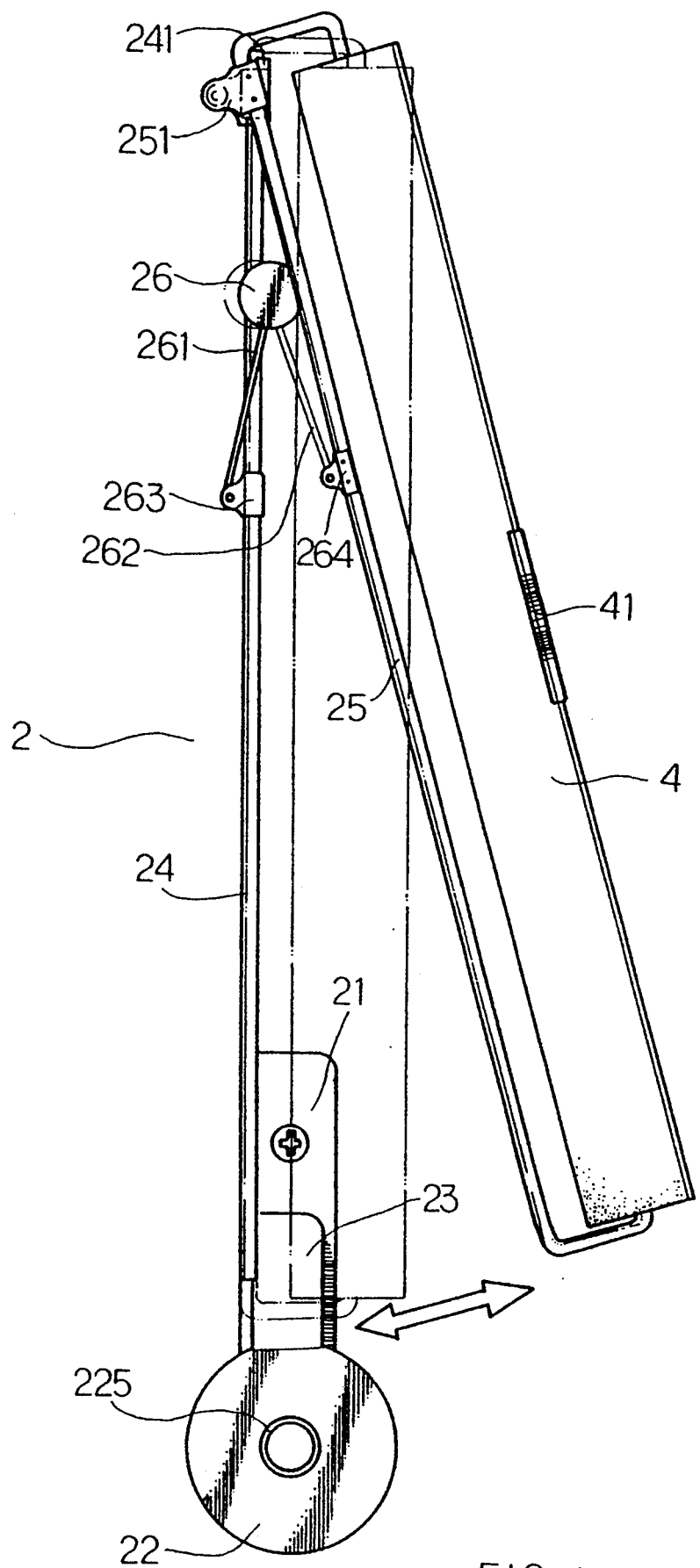
FIG. 1 shows an adjustable sunshade according to the preferred embodiment of the present invention.
Figure 2:
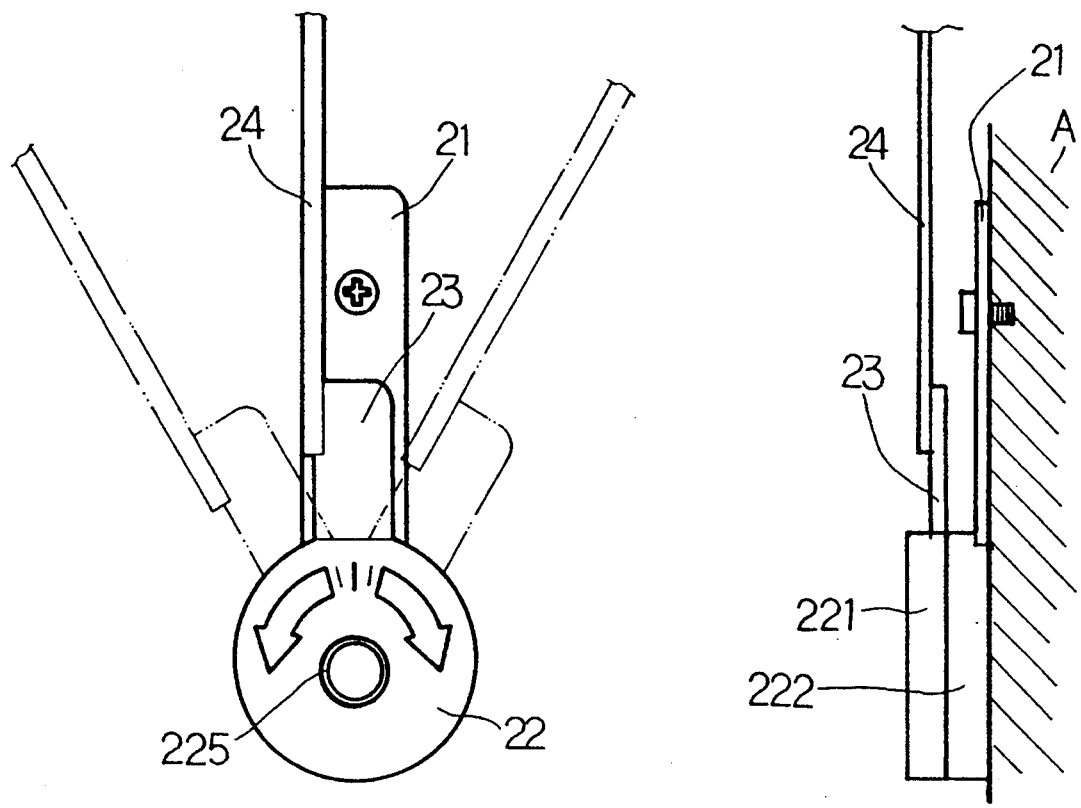
FIG. 2 shows the first swivel joint of the adjustable sunshade turned to move the supporting rod.

Referring to FIGS. 1, 2, 2A, and 4, an adjustable sunshade in accordance with the present invention is generally comprised of a sunshade holder 2, a locating device 3, and a screen 4 having a retainer 41 at the lead end thereof in the middle. The sunshade holder 2 comprises a mounting frame 21 affixed to the body of an automobile at one side between the windscreen and the door window, a first swivel joint 22 connected to the mounting frame 21, a supporting rod 24, a connecting plate 23 connected between the first swivel joint 22 and the supporting rod 24, a bracket 25 to hold the screen 4, and a second swivel joint 26. The first and second swivel joints 22 and 26 are similar in structure, each comprised of a first block 221 and a second block 222 connected by a rivet 225. The second block 222 includes at least one of blind hole 2221 at the border of the second block 222 at one side, each blind hole 2221 receiving a respective spring 224 and a respective steel ball 223. When assembled, the steel ball 223 is stopped against the first block 221. Referring to FIG. 2A, the first and second blocks 221 and 222 of the first swivel joint 22 are respectively connected to the mounting frame 21 and the connecting plate 23, therefore, turning the first block 221 on the second block 222 causes the supporting rod 24 to move relative to the mounting frame 21. The supporting rod 24 has a bottom end fastened to the connecting plate 23, and a top end covered with a sleeve 241. The bracket 25 comprises an upper barrel 251 on the top end thereof hinged to the sleeve 241 on the supporting rod 24. The first and second blocks 221 and 222 of the second swivel joint 26 are respectively fastened with a respective rod 261 or 262, each rod 261 or 262 having an opposite end hinged to a respective barrel 263 or 264. The barrel 263 is affixed to the supporting rod 24. The barrel 264 is made to slide on the bracket 25.

Figure 3:
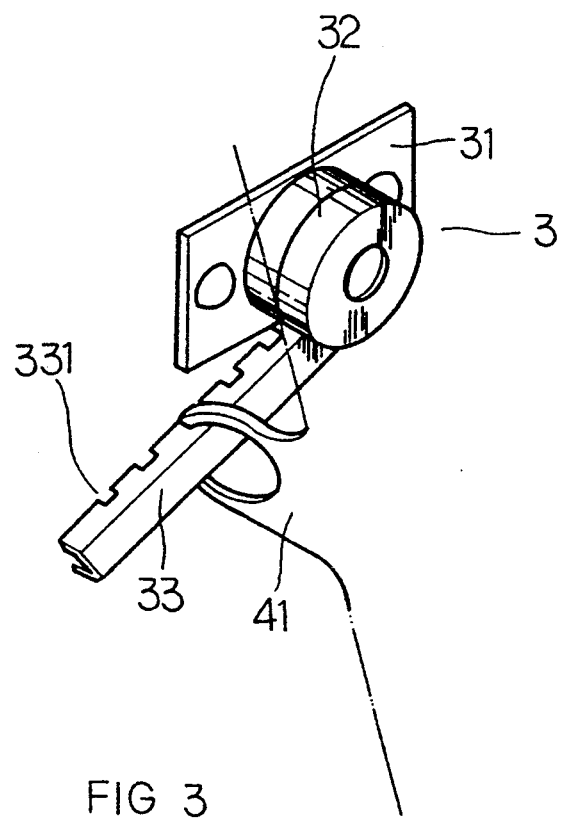
FIG. 3 is an elevational view of the locating device of the adjustable sunshade of FIG. 1.
Figure 4:
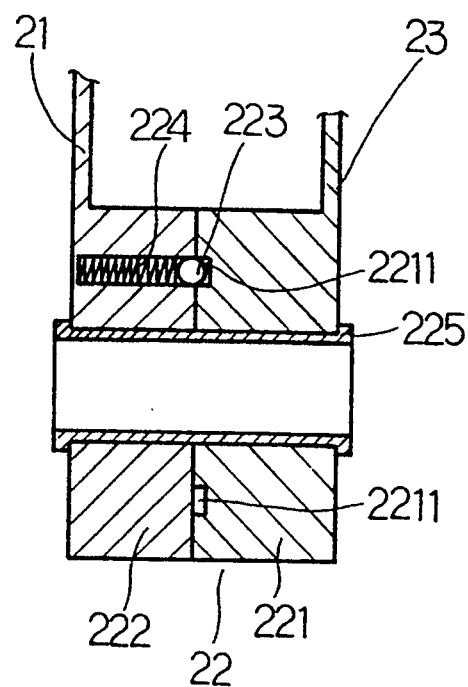
FIG. 4 is an exploded view of a swivel joint according to the present invention.
Figure 4:
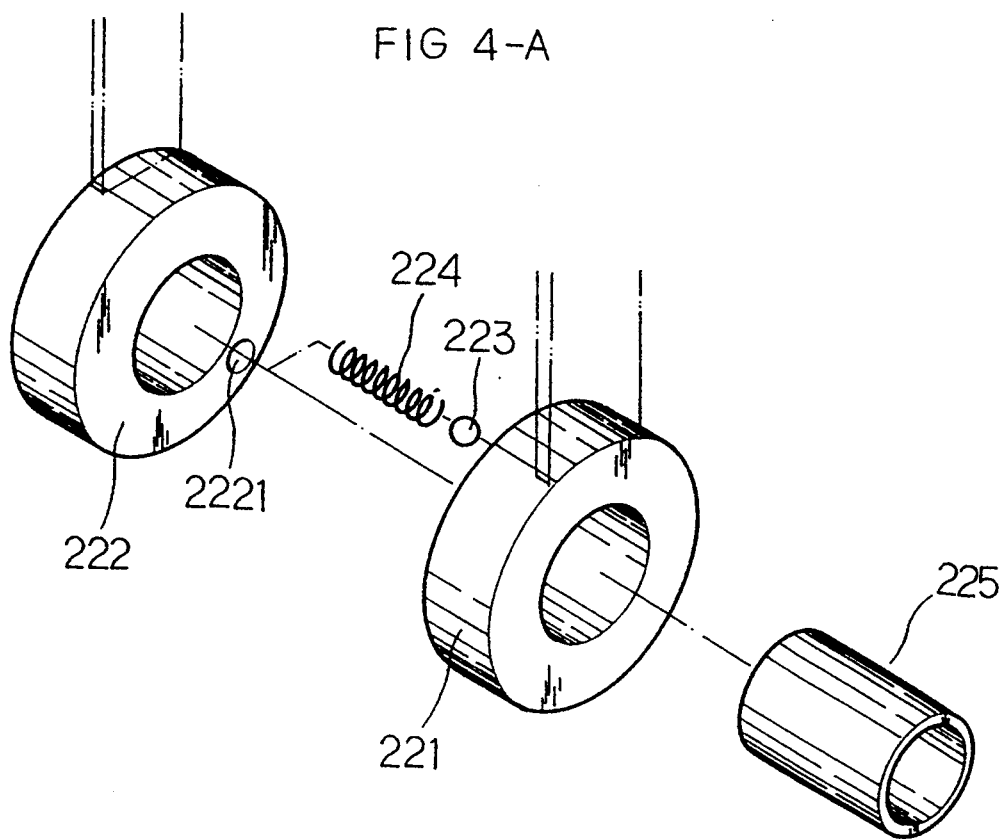

Referring to FIG. 3, the locating device 3 comprises a mounting frame 31 affixed to the body of the automobile opposite to the mounting frame 21 of the sunshade holder 2, a locating rod 33, and a third swivel joint 32 connected between the locating rod 33 and the mounting frame 31. The locating rod 33 comprises a series of notches 331 which receive the retainer 41 of the screen 4.

Figure 5:
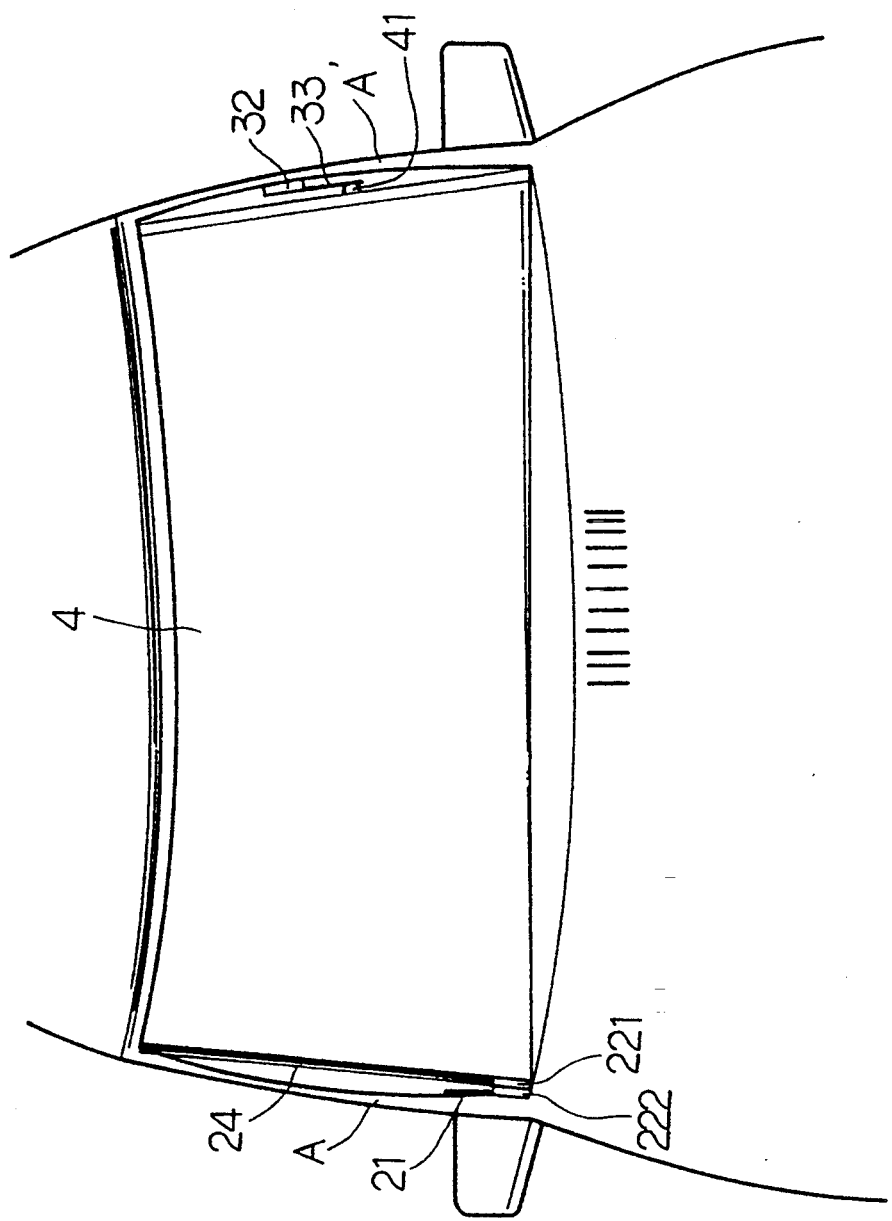
FIG. 5 is an installed view showing the sunshade holder installed in the windscreen.

Referring to FIG. 5, when the screen 4 is extended across the windscreen of au automobile in a direction away from the bracket 25, the retainer 41 is fastened to the locating rod 33 of the locating device 3. When installed, the first and second swivel joints 22 and 26 can be turned to adjust the angular position of the sunshade 4.

What is claimed is:

1. An adjustable sunshade comprising:
a sunshade holder which includes a mounting frame affixed to a body of a car at a first side of a windscreen of the car, a supporting rod having a top end and a bottom end, wherein the bottom end is connected to a connecting plate, a first swivel joint having a first end connected to said connecting plate and a second end connected to the mounting frame of said sunshade holder, a bracket having a top end hinged to the top end of said supporting rod, a screen mounted on said bracket, said screen having a retainer on a lead end thereof, a second swivel joint having a first end fastened with a first rod hinged to a hinge affixed to said supporting rod and a second end fastened with a second rod hinged to a hinge made to slide on said bracket; and a locating device which includes a mounting frame affixed to the body of the car at a second side of said windscreen, a locating rod having a series of retaining notches for holding said retainer of said screen, and a third swivel joint having a first end connected to the mounting frame of said locating device and a second end connected to said locating rod.

2. The adjustable sunshade of claim 1, wherein the first swivel joint includes a first block and a second block connected together by a rivet, wherein said first and second blocks are turnable on said rivet relative to each other, said second block including at least one blind hole located at a border of the second block, wherein the blind hole receives a spring and a steel ball, the steel ball in the blind hole being supporting on the spring and stopped against said first block.

3. The adjustable sunshade of claim 2, wherein the second swivel joint includes a first block and a second block connected together by a rivet, wherein said first and second blocks are turnable on said rivet relative to each other, said second block including at least one blind hole located at a border of the second block, wherein the blind hole receives a spring and a steel ball, the steel ball in the blind hole being supported on the spring and stopped against said first block.

4. The adjustable sunshade of claim 1, wherein the second swivel joint includes a first block and a second block connected together by a rivet, wherein said first and second blocks are turnable on said rivet relative to each other, said second block including at least one blind hole located at a border of the second block, wherein the blind hole receives a spring and a steel ball, the steel ball in the blind hole being supported on the spring and stopped against said first block.

5. An adjustable sunshade, comprising:

a sunshade holder which includes a mounting frame attachable to a car at a first side of a windscreen of the car; a supporting rod having a top end and a bottom end, wherein the bottom end is connected to a connecting plate; a first swivel joint having a first end connected to said connecting plate and a second end connected to the mounting frame of the sunshade holder; a bracket having a top end connected to the top end of the supporting rod; a screen mounted on the bracket, the screen having a retainer on a lead end thereof; and a second swivel joint having a first end connected with a first rod attached to the supporting rod and a second end connected with a second rod, wherein the second rod is slidably connected to the bracket; and a locating device which includes a mounting frame attachable to the car at a second side of the windscreen; and a locating rod including at least one retaining notch for holding the retainer of the screen.

6. The adjustable sunshade of claim 5, wherein the locating device includes a third swivel joint having one end connected to the mounting frame of the locating device and a second end connected to the locating rod.

7. The adjustable sunshade of claim 5, wherein the first swivel joint includes a first block and a second block connected to the first block, wherein the first and second blocks are turnable relative to each other, the second block including at least one blind hole located at a border of the second block, wherein the blind hole receives a spring and a steel ball, the steel ball in the blind hole being supported on the spring and stopped against the first block.

8. The adjustable sunshade of claim 7, wherein the second swivel joint includes a first block and a second block connected to the first block, wherein the first and second blocks are turnable relative to each other, the second block including at least one blind hole located at a border of the second block, wherein the blind hole receives a spring and a steel ball, the steel ball in the blind hole being supported on the spring and stopped against the first block.

9. The adjustable sunshade of claim 5, wherein the second swivel joint includes a first block and a second block connected to the first block, wherein the first and second blocks are turnable relative to each other, the second block including at least one blind hole located at a border of the second block, wherein the blind hole receives a spring and a steel ball, the steel ball in the blind hole being supported on the spring and stopped against the first block.

* * * * *